(12) United States Patent
Sagduyu et al.

(10) Patent No.: US 11,005,843 B1
(45) Date of Patent: May 11, 2021

(54) SYSTEM AND MEANS FOR DETECTING AUTOMATED PROGRAMS USED TO GENERATE SOCIAL MEDIA INPUT

(71) Applicant: Intelligent Automation, Inc., Rockville, MD (US)

(72) Inventors: Yalin Evren Sagduyu, Gaithersburg, MD (US); Ziad El-Jamous, Rockville, MD (US); Min Ding, Poolesville, MD (US); Vikram Manikonda, Bethesda, MD (US); Yi Shi, Germantown, MD (US)

(73) Assignee: Intelligent Automation, Inc., Rockville, MD (US)

(*) Notice: Subject to any disclaimer, the term of this patent is extended or adjusted under 35 U.S.C. 154(b) by 41 days.

(21) Appl. No.: 16/668,920

(22) Filed: Oct. 30, 2019

Related U.S. Application Data

(63) Continuation-in-part of application No. 15/391,998, filed on Dec. 28, 2016, now abandoned.

(60) Provisional application No. 62/272,167, filed on Dec. 29, 2015.

(51) Int. Cl.
*H04L 29/06* (2006.01)
*G06Q 50/00* (2012.01)
*H04L 12/58* (2006.01)
*H04L 29/08* (2006.01)
*H04L 9/32* (2006.01)

(52) U.S. Cl.
CPC ......... *H04L 63/0876* (2013.01); *G06Q 50/01* (2013.01); *H04L 9/3247* (2013.01); *H04L 51/046* (2013.01); *H04L 67/306* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,997,226 | B1* | 3/2015 | Call | H04L 63/1416 726/22 |
| 2005/0044037 | A1* | 2/2005 | Lawrence | G06Q 20/403 705/38 |
| 2010/0312837 | A1* | 12/2010 | Bodapati | G06F 16/951 709/206 |
| 2012/0011245 | A1* | 1/2012 | Gillette | G06Q 10/107 709/224 |
| 2012/0313948 | A1* | 12/2012 | Bergman | G06Q 50/01 345/440 |
| 2014/0067656 | A1* | 3/2014 | Cohen Ganor | G06Q 20/384 705/39 |
| 2014/0337972 | A1* | 11/2014 | Foster | H04L 67/306 726/22 |

(Continued)

*Primary Examiner* — Eleni A Shiferaw
*Assistant Examiner* — Sakinah White Taylor
(74) *Attorney, Agent, or Firm* — Krieg DeVault, LLP; Daniel Tychonievich

(57) ABSTRACT

A means and system is designed to distinguish human users from bots (automated programs to generate posts or interactions) in social media (including microblogging services and social networking services) by assigning a likelihood score to each user for being a human or a bot. The bot score assigned to each user is computed from statistical, temporal and text features that are detected in user's social media interactions (relative indicators specific to a given social media data set) and user's historical profile information.

9 Claims, 5 Drawing Sheets

(56) References Cited

U.S. PATENT DOCUMENTS

| | | | |
|---|---|---|---|
| 2014/0344206 A1* | 11/2014 | Deng | G06N 5/04 706/47 |
| 2015/0142595 A1* | 5/2015 | Acuna-Rohter | G06Q 30/06 705/21 |
| 2016/0314113 A1* | 10/2016 | Moharrami | H04L 51/32 |

* cited by examiner

SYSTEM AND MEANS FOR DETECTING AUTOMATED PROGRAMS USED TO GENERATE SOCIAL MEDIA INPUT

This continuation-in-part application claims priority from U.S. Utility patent application Ser. No. 15/391,998 filed on Dec. 28, 2016 and U.S. Provisional Patent Application Ser. No. 62/272,167 filed on Dec. 29, 2015, the entirety of which are incorporated by reference herein.

This invention was supported in part by the Defense Advanced Research Projects Agency (DARPA) grant number W31P40-13-C-0055. The Government has certain rights in the invention.

BACKGROUND OF THE INVENTION

The subject invention relates to a system and means for detecting bots (automated programs to generate social media posts and interactions), and in particular, to a method that assigns a likelihood score to each user for being a bot or human user. The assignment of bot score is based on statistical, temporal and text features that are detected in user's social media posts, interactions and historical profile information.

Social media such as microblogging and social networking services are generating large-scale data at an increasing pace. Social media analytics (algorithms analyzing social media data, including graph, machine learning and natural language processing algorithms) provide means to extract, capture and analyze social media data for different purposes, including marketing, advertisement and recruitment.

Social media data is available through either public Application Program Interfaces (APIs) or paid data services. However, this data is often noisy with elements that are not essential to the reasoning of social media analytics. These non-essential social media elements contribute noise and bias to data and they are often generated in large volumes by bots, including programs to generate spamming and phishing attacks, unsolicited advertisements and automated social feeds reporting news. Therefore, it is important to identify bots and eliminate them from social media data before running social media analytics. Filtering automated content increases the level of credibility of social media content.

SUMMARY OF THE INVENTION

In one embodiment of the invention, a system and means are provided for detecting bots in a given social media data set by assigning a likelihood score to each user for being a human or a bot. The means determines the likelihood that a social media post has been generated by a human or automated program. The bot score assigned to each user is computed from statistical, temporal and text features that are detected in user's social media posts, interactions and historical profile information.

Features that are detected in social media interactions (such as reply, mention and retweet activities in TWITTER) correspond to relative indicators specific to given social media data set. Such features for a particular user include the rate of social media posts (such as tweets), the similarity of social media posts, the minimum value of time intervals between social media posts, the deviation of time intervals between social media, and the ratios of hyperlinks, replies, mentions, and references (by the user or at the user) found in social media posts.

On the other hand, features that are detected in historical profile information correspond to absolute indicators from the time of account creation to the time of running bot detection. Such features for a particular user include the life post rate, the followers/friends ratio, the presence/absence of bot-characteristic words in username and profile description, the length of username, the presence/absence of numbers in username, the user account age, the use of API or auto-piloted programs and the change in user locations.

Depending on a particular feature, the score may be computed in one of two different ways. In absolute form, the feature is assigned a score that solely depends on a particular user's social media interaction or profile characteristics (independent of other users). In relative form, the feature for a particular user is assigned a score that is normalized with respect to features of other users. These features include the life post rate, the username length, the user account age, the ratio of replies, the ratio of references and the rate of posts in the given social media data.

Each feature is assigned a score and then feature scores of each user are projected to a smaller dimension by using dimension reduction techniques (such as principal component analysis) by removing any potential redundancy (such as the one measured by cross-correlation of feature scores) among features. Then, those dimension-reduced features are aggregated to provide a likelihood bot score to each user. This aggregation follows one of two different ways. In an unsupervised sense, weights are assigned to each score and the weighted sum (normalized to [0,1]) is provided as the likelihood that a user is a bot. If a training data set is available (with known bot and/or human user sets), weights are learned by minimizing the weighted sum of features computed for known bots and human users. Known bots can be extracted from news feeds or advertisements and human users can be extracted from users verified by the social media platform. The other way to aggregate features is to train a classifier (such as Naive Bayes classifier) with the training data using the feature scores and then use this classifier to classify each user as human or bot, while assigning the confidence of classifier (such as likelihood of classification in Naive Bayes classifier) as the likelihood that a user is a bot or human user. Users with high bot scores are classified into different types of bots using content features representative of each bot type.

A targeted search of bots is used to compute the efficiency of bot detection (such as average bot score) under different search (data query) parameters (such as a keyword), and the search parameter is updated to detect a larger set of additional bots with higher bot scores compared to the previous search. This means collecting new social media data automatically with the updated search parameter and checking bot scores under the updated search parameter to measure the efficiency of bot detection.

The system and means for detecting bots beneficially allows for identifying non-essential content in social media, cleaning social media data sets by detecting the spam and phishing attacks, unsolicited advertisements, and automated posting services for social media feeds (such as news) and identifying the popularity of a social event by the number of bots it attracts.

BRIEF DESCRIPTION OF THE DRAWINGS

The above-mentioned and other features and objects of this invention and the manner of obtaining them will become more apparent and the invention itself will be better understood by reference to the following description of embodi ments of the present invention taken in conjunction with the accompanying drawings, wherein.

Figure 1:
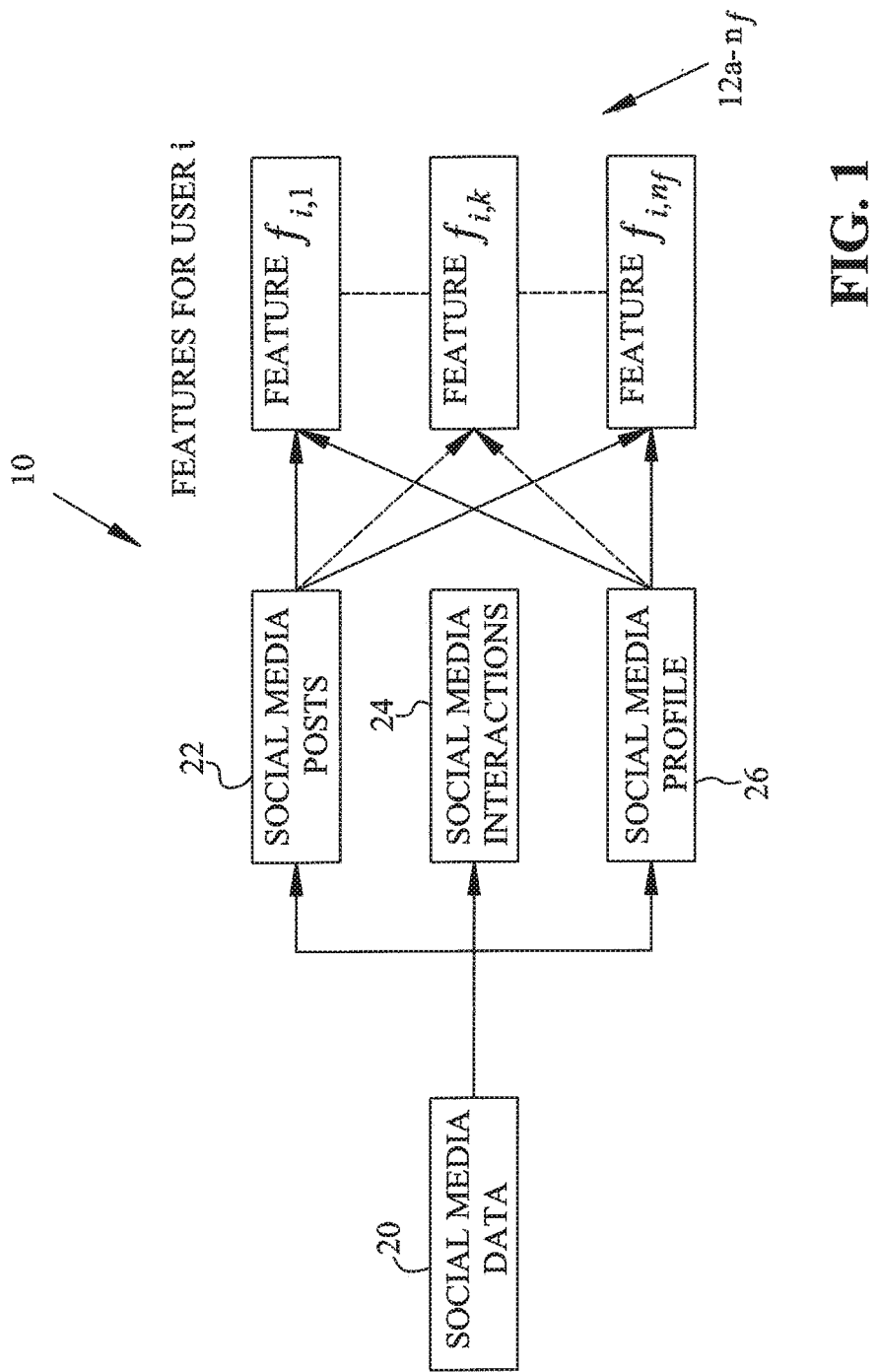
FIG. 1 is a diagram for extracting bot features for each user from social media posts, interactions and profile information that are obtained from the social media data input.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

As discussed above, social media data is growing in terms of volume and type, involving complex interactions of social media actors and groups. Analysis of social media is needed to better understand relationships and interactions among people and predict social outcomes. However, social media data contains a significant amount of noise, generated by posts and interactions from automated programs. Such users, commonly referred to as bots, pursue their own agendas (such as advertising and spamming) while creating significant bias to social media data and thereby making social media analytics a difficult task. These bots show particular behavior compared to human users and relevant indicators should be extracted from their posts, interactions and profile information for successful detection of bots. This invention provides a means and system to identify these indicators at two levels. First, some indicators (such as the social media posting pattern) are relative to the analyzed social media data set, while some other indicators (such as profile information) are absolute in the sense they do not necessarily change from one data set to the other. Second, some indicators (such as the similarity of social media posts by a particular user) are independent of other users, whereas some indicators (such as the rate of social media posts by a user) require a normalization with respect to other users.

The subject invention for detecting bots in a given social media data set follows four main steps:

1. scores are computed for features of each user based on social media posts and interactions in the given social media data set, and a score is assigned to each feature;
2. scores are computed for features of each user in the social media data set based on the historical pattern of social media use and profile information, and a score is assigned to each feature;
3. scores are aggregated for different bot features of each user by potentially normalizing scores with respect to other users; and
4. a bot score is assigned to each user in the social media data set as the likelihood that a user is a bot or a human by either computing a weighted sum of feature scores or training a classifier with the features that are found from social media posts, interactions and profile information, and type of bot is classified.

The system for detecting bots in a social media posts utilizes a computer having a processor and data storage capabilities. Software for performing the steps is loaded thereon and run in conjunction with input from social media in order to score whether a post is likely from a bot or human user.

Referring to FIG. 1, a diagram for the extraction of bot detection features and assignment of scores to features is shown, generally indicated as 10. The features are generally indicated as $12a\text{-}n_f$. As shown in FIG. 1, social media data 20 relate to social media posts 22, social media interactions 24 and social media profiles 26. The system provides mapping of each user's social media posts 22 and social media interactions 24 to bot features $12a\text{-}n_f$, and assigning scores to features $12a\text{-}n_f$ as relative indicators of bot behavior specific to a given social media data set. Additionally, the system maps each user's historical pattern of social media use and profile information 26 to bot features $12a\text{-}n_f$ as absolute indicators of bot behavior over the account lifetime.

Figure 1A:
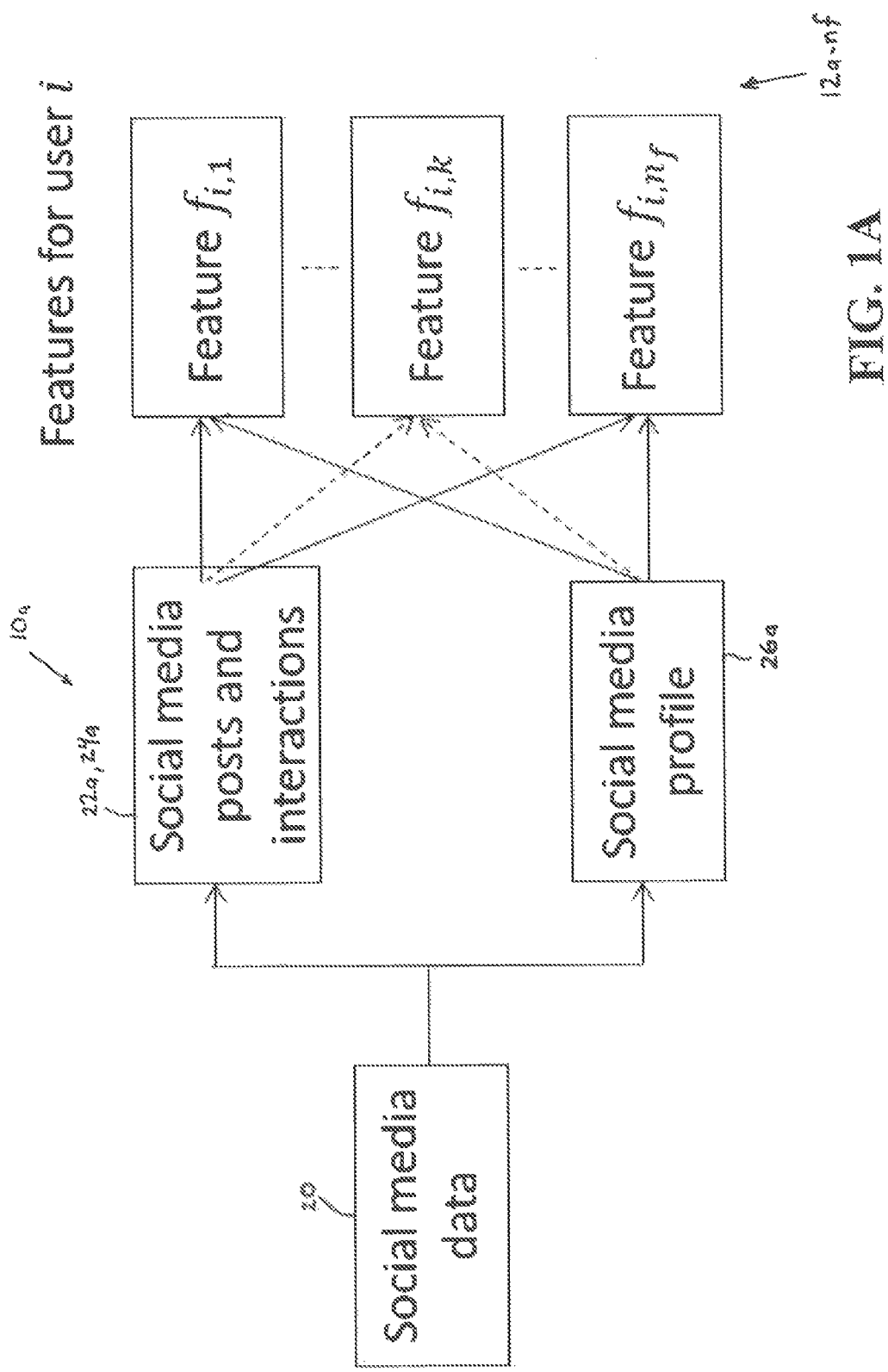
FIG. 1A is a modified diagram embodiment for extracting bot features for each user from social media posts, interactions and profile information that are obtained from the social media data input.

Now referring to FIG. 1A, it should be appreciated that bots tend to have the following characteristics in terms of the pattern of historical social media usage and profile information: A bot user i tends to have a large number of historical social media posts, have social media posts with bot-characteristic words, have a long username, have a large count of numbers in username, have a short account lifetime, use API or auto-piloted programs and have limited changes in location.

The bot detector assigns a likelihood score to each user for being a human or a bot. The bot score assigned to each user is computed from statistical, temporal and text features that are detected in user's social media posts 22a, interactions and historical profile information. Features that are detected in social media interactions 24a correspond to relative indicators specific to given social media data set 20 as shown in FIG. 1A. On the other hand, features that are detected in historical profile information 26a correspond to absolute indicators from the time of account creation to the time of running bot detection.

The following scores are computed on a computer comprising a processor and non-transitory medium having computer executable instructions stored thereupon which for features based on social media posts and interactions:

| Feature ID | Description |
|---|---|
| 1 | The rate of social media posts, normalized by the window size of social media data set |
| 2 | The text similarity for user i computed as the maximum value of cosine distance for pairs of social media posts by that user i |

-continued

| Feature ID | Description |
|---|---|
| 3 | The minimum value of time intervals between social media posts computed for user i |
| 4 | The similarity of time intervals between social media posts to uniform distribution (such as measured using chi-square test) |
| 5 | The ratio of hyperlinks computed as the number of social media posts by user i including at least one hyperlink and normalized by the total number of social media posts |
| 6 | The ratio of comments computed as the number of social media posts by user i commented by other users normalized by the total number of social media posts |
| 7 | The ratio of mentions computed as the number of social media posts by user i mentioning other users normalized by the total number of social media posts |
| 8 | The ratio of referenced social media posts computed as the number of social media posts by user i referenced (such as reposted) by other users normalized by the total number of social media posts |

The following scores are computed for features based on the pattern of historical social media usage and profile information:

| Feature ID | Description |
|---|---|
| 9 | The life post rate computed as the number of posts for user i normalized by the window size starting from the time of user account creation |
| 10 | The number of times the username or user profile includes any bot-characteristic word (such as "bot" or "app") is computed for user i, this number is mapped to a non-decreasing function $f_{i,12}$, (e.g., identity or indicator). |
| 11 | The length of username computed for user i |
| 12 | The count of numbers in username normalized by the maximum count of characters allowed in username is computed for user i |
| 13 | The user account age computed for user i |
| 14 | The return of indicator function when user i uses API or auto-piloted programs for social-media posts |
| 15 | The change in locations (such as measured by distance between geo-coordinates) is computed for user i |
| 16 | The number of times the social media posts of a user include any bot-characteristic word (such as "bot" or "app") is computed for user i, this number is mapped to a non-decreasing function (e.g., identity or indicator) |

Wherein, Features Scores $s_{i,2}$, $s_{i,4}$, $s_{i,5}$, $s_{i,14}$, and $s_{i,16}$ are from [0,1]. On the other hand, scores $s_{i,1}$, $s_{i,3}$, $s_{i,6}$, $s_{i,7}$, $s_{i,8}$, $s_{i,9}$, $s_{i,10}$, $s_{i,11}$, $s_{i,12}$, $s_{i,13}$, $s_{i,15}$ are normalized to [0,1] with respect to scores of others such as the maximum and minimum value of scores among users, i.e., $s_{i,k}$ is as $$\frac{s_{i,k} - \min_i s_{i,k}}{\max_i s_{i,k} - \min_i s_{i,k}}.$$

Definition topk parameter is the maximum number of bots returned by the application.
blacklist is a known list of bots.
whitelist is a known list of non-bots such as news accounts
botlist is a the list of bots
scannedlist is the list of the current scanned users
get_topk_percent return the top k percentile.

Bot Pseudocode:
Bot (topk):
   get_posts_data( );
   set weights_for_features;
   Iterate over all posts:
   Check if user in blacklist:
      Add user to botlist;
   Check if user in whitelist:
      Go to the next post;
   gup=get_userprofile( );//return the normalized features between
   [0,1]
   Add gup to scannedlist
   botlist=get_topk_percent(scannedlist)

Figure 2:
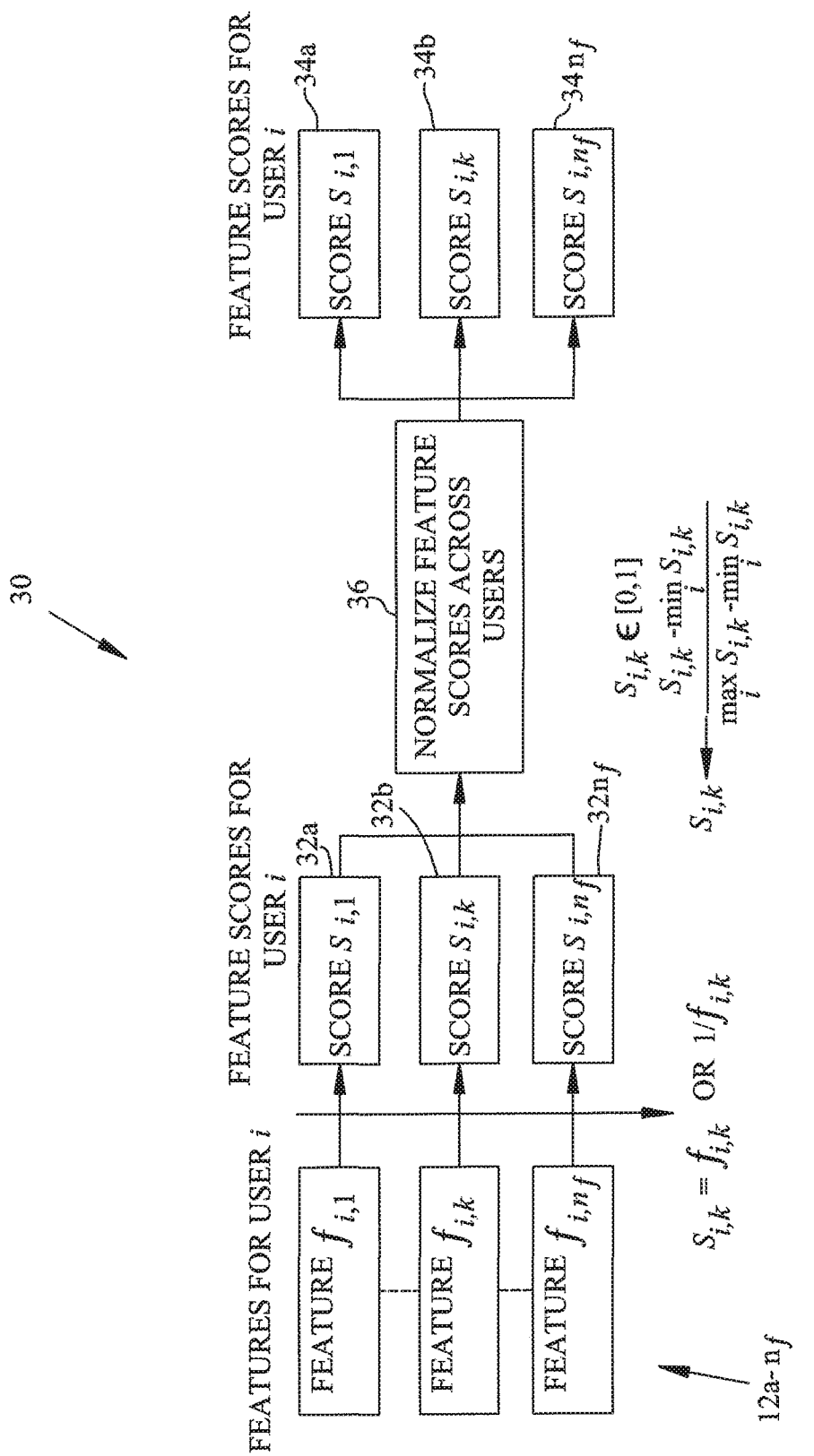
FIG. 2 is a diagram for converting bot features to feature scores for each user and normalizing them with respect to other users.

Referring to FIG. 2, a diagram of the computation of individual feature scores and their combination is shown generally indicated as 30, and includes computing the score 32a-$n_f$ of a feature separately per user and computing the score 34a-$n_f$ of a feature by normalizing 36 relative to other users' social media interactions, historical patterns of social media use and profiles.

Figure 3:
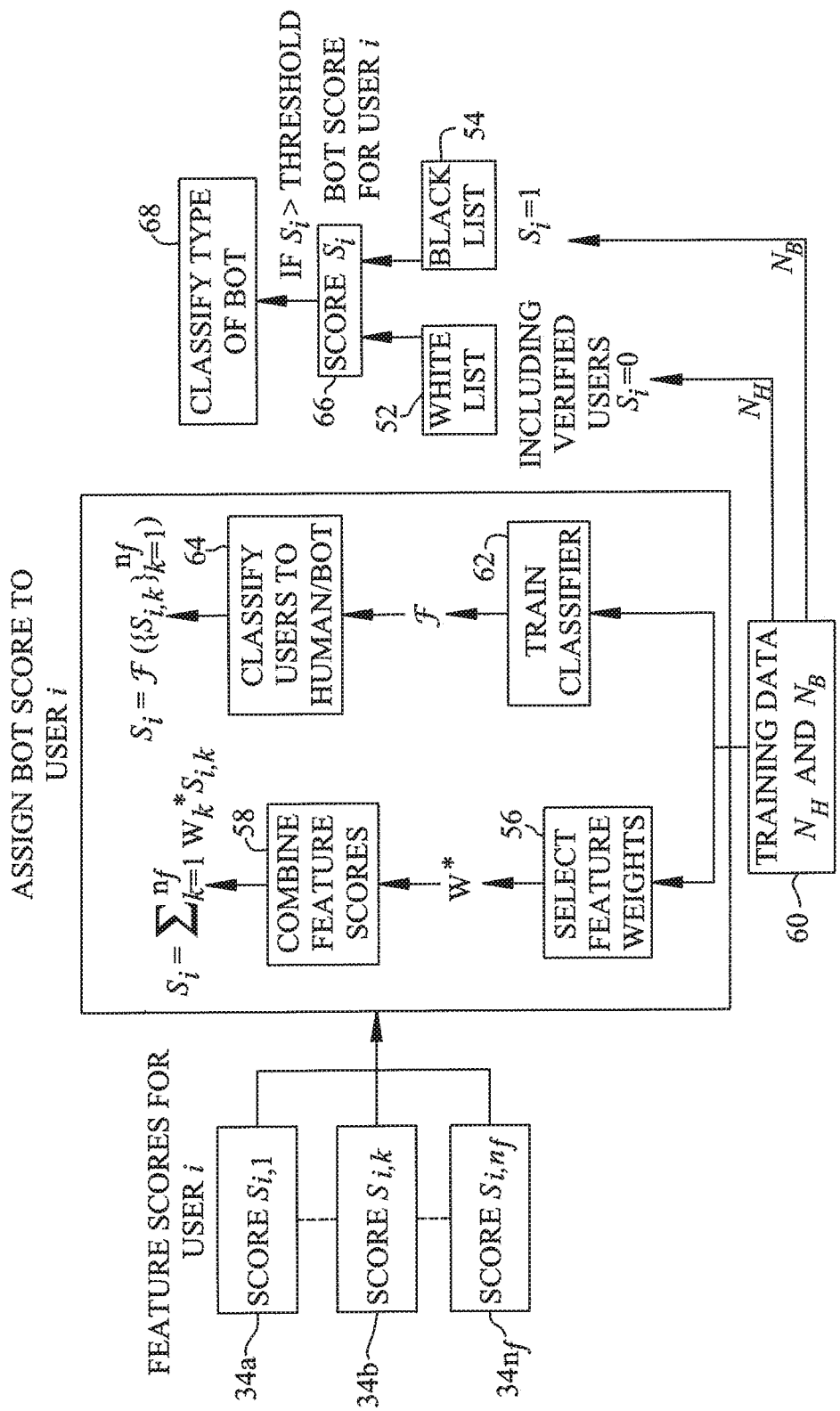
FIG. 3 is a diagram for assigning bot score to each user based on aggregation of feature scores, including weighted sum of feature scores and training a classifier based on feature scores, and classifying bot type.

Referring to FIG. 3, a diagram showing the assignment of bot scores to users is shown generally indicated as 50. Assignment of bot scores to users includes checking verified users and users in white lists 52 and black lists 54. The weighted sum of scores of features 56 is combined to the bot score 58; wherein weights may be determined from training data 60. This bot score is assigned to each user 66. A classifier is trained 62 to classify each user 64 to a bot or human with the confidence of the classifier assigned as the bot score to each user 66; wherein the classifier may be trained from training data 60. Users with high bot scores are classified to types of bots (such as spam bots or propaganda bots) using content features 68.

Figure 4:
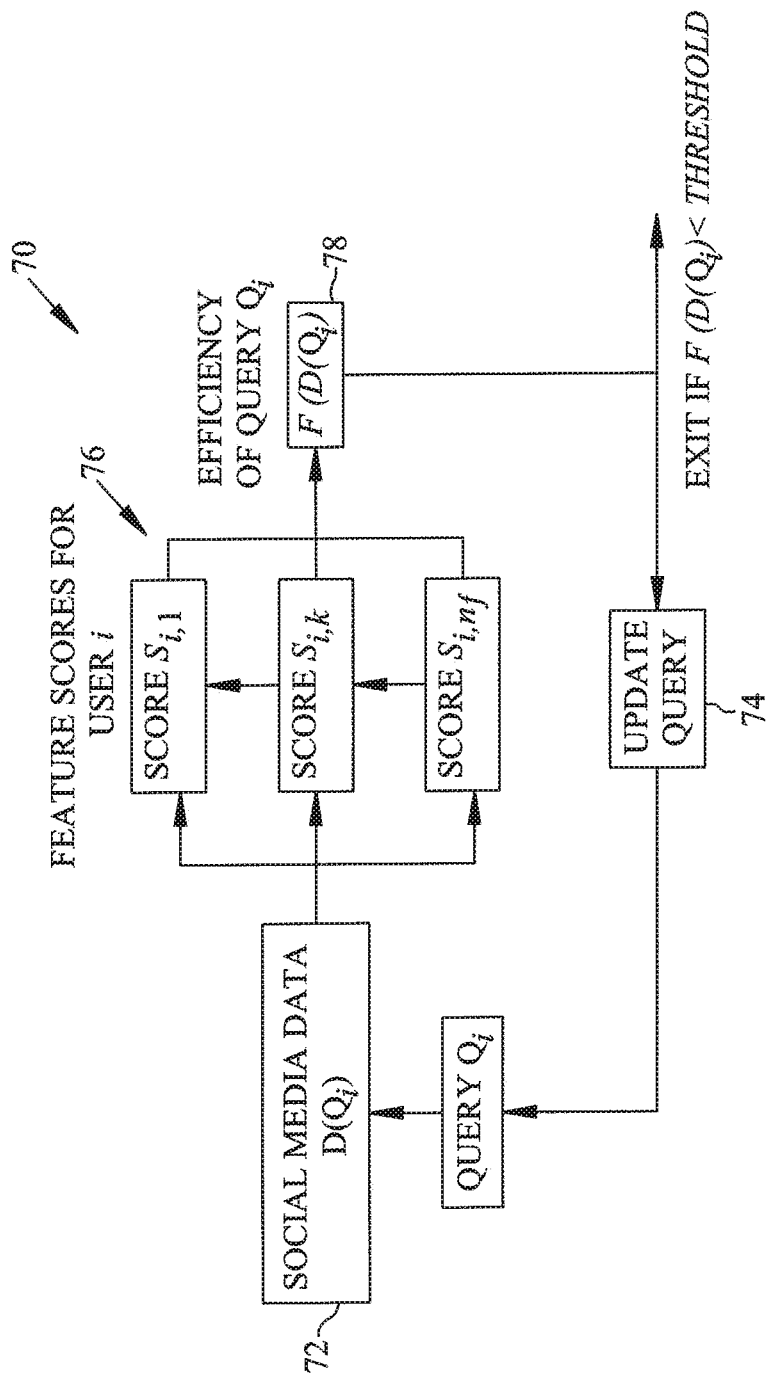
FIG. 4 is a diagram for updating data query to compute and improve the efficiency of bot detection.

A diagram of the targeted search of bots to improve the efficiency of bot detection is shown generally indicated as 70 in FIG. 4. This means includes computing the efficiency of bot detection (such as average bot score) under different search (data query) parameters 72 (such as a keyword), updating the search parameter 74 to detect a larger set of additional bots with higher bot scores compared to previous search, and collecting new social media data automatically with the updated search parameter and checking bot scores 76 under the updated search parameter to measure the efficiency of bot detection 78.

Bots tend to have the following characteristics in terms of social media posts and interactions: A bot user i tends to have a large number of social media posts (feature $f_{i,1}$), have similar social media posts (feature $f_{i,2}$), have small delays between social media posts (feature $f_{i,3}$), show periodic patterns in social media posts (feature $f_{i,4}$), have a large number of hyperlinks (feature $f_{i,5}$), receive a small number of replies (feature $f_{i,6}$), receive a small number of replies (feature $f_{i,6}$), mention a small number of users (feature $f_{i,7}$), receive a small number of references (feature $f_{i,8}$), and refer to a small number of users (feature $f_{i,9}$).

The following scores are computed for features based on social media posts and interactions:

The rate of social media posts, $f_{i,1}$, is computed as the number of posts (such as tweets) for user i normalized by the window size of social media data set, and the feature score $s_{i,1}$ is assigned directly proportional to $f_{i,1}$, i.e., $s_{i,1}=f_{i,1}$.

The text similarity, $f_{i,2}$, for user i computed as the maximum value of cosine distance for pairs of social media posts (such as tweets) by that user, and the feature score $s_{i,2}$ is assigned directly proportional to $f_{i,2}$, i.e., $s_{i,2}=f_{i,2}$.

The minimum value of time intervals, $f_{i,3}$, between social media posts (such as tweets) is computed for user i and the feature score $s_{i,3}$ is assigned inversely proportional to $f_{i,3}$, i.e., $s_{i,3}=1/f_{i,3}$, where $s_{i,3}=0.5$ if $f_{i,3}=0$.

The similarity of time intervals, $f_{i,4}$, between social media posts (such as tweets) to uniform distribution (such as measured using chi-square test) is computed for user i and the feature score $s_{i,4}$ is assigned directly proportional to $f_{i,4}$, i.e., $s_{i,4}=f_{i,4}$.

The ratio of hyperlinks, $f_{i,5}$, is computed as the number of social media posts by user i including at least one hyperlink and normalized by the total number of social media posts, and the feature score $s_{i,5}$ is assigned directly proportional to $f_{i,5}$, i.e., $s_{i,5}=f_{i,5}$.

The ratio of replies, $f_{i,6}$, is computed as the number of social media posts by user i replied by other users normalized by the total number of social media posts, and the feature score $s_{i,6}$ is assigned inversely proportional to $f_{i,6}$, i.e., $s_{i,6}=1/f_{i,6}$, where $s_{i,6}=0.5$ if $f_{i,6}=0$.

The ratio of mentions, $f_{i,7}$, is computed as the number of social media posts by user i mentioning other users normalized by the total number of social media posts, and the feature score $s_{i,7}$ is assigned inversely proportional to $f_{i,7}$, i.e., $s_{i,7}=1/f_{i,7}$, where $s_{i,7}=0.5$ if $f_{i,7}=0$.

The ratio of referenced social media posts, $f_{i,8}$, is computed as the number of social media posts by user i referenced (such as retweeted) by other users normalized by the total number of social media posts, and the feature score $s_{i,8}$ is assigned inversely proportional to $f_{i,8}$, i.e., $s_{i,8}=1/f_{i,8}$, where $s_{i,8}=0.5$ if $f_{i,8}=0$.

The ratio of referencing social media posts, $f_{i,9}$, is computed as the number of social media posts by user i further referencing (such as retweeting) by other user's posts normalized by the total number of social media posts, and the feature score $f_{i,9}$, is assigned directly proportional to $f_{i,9}$, i.e., $s_{i,9}=f_{i,9}$.

Bots tend to have the following characteristics in terms of the pattern of historical social media usage and profile information: A bot user i tends to have a large number of historical social media posts (feature $f_{i,10}$), have asymmetric numbers of followers and friends (feature $f_{i,11}$), have social media posts with bot-characteristic words (feature $f_{i,12}$), have a long username (feature $f_{i,13}$), have a large count of numbers in username (feature $f_{i,14}$), have a short account lifetime (feature $f_{i,15}$), use API or auto-piloted programs (feature $f_{i,16}$) and have limited changes in location (feature $f_{i,17}$).

The following scores are computed for features based on the pattern of historical social media usage and profile information:

The life post rate, $f_{i,10}$, is computed as the number of posts (such as tweets) for user i normalized by the window size starting from the time of user account creation, and the feature score $s_{i,10}$ is assigned directly proportional $f_{i,10}$, i.e., $s_{i,10}=f_{i,10}$.

The asymmetry of followers and friends counts, $f_{i,11}$, is computed as the followers/friends ratio for user i and the feature score $s_{i,11}$ is assigned directly proportional to $f_{i,11}$, i.e., $s_{i,11}=f_{i,11}$.

The number of times the username or user profile includes any bot-characteristic word (such as "bot" or "app") is computed for user i, this number is mapped to a non-decreasing function $f_{i,12}$, (e.g., identity or indicator) and the feature score $s_{i,12}$ is assigned directly proportional to $f_{i,12}$, i.e., $s_{i,12}=f_{i,12}$.

The length of the username, $f_{i,13}$, is computed for user i and the feature score $s_{i,13}$ is assigned directly proportional to $f_{i,13}$, i.e., $s_{i,13}=f_{i,13}$.

The count of numbers in username, $f_{i,14}$, normalized by the maximum count of characters allowed in username is computed for user i and the feature score $s_{i,14}$ is assigned directly proportional to $f_{i,14}$, i.e., $s_{i,14}=f_{i,14}$.

The user account age, $f_{i,15}$, is computed for user i and the feature score $s_{i,15}$ is assigned inversely proportional to $f_{i,15}$, i.e., $s_{i,15}=1/f_{i,15}$, where $s_{i,15}=0.5$ if $f_{i,15}=0$.

The return of indicator function when user i uses API or auto-piloted programs for social-media posts, $f_{i,16}$, is computed and the feature score $s_{i,16}$ is assigned directly proportional to $f_{i,16}$, i.e., $s_{i,12}=f_{i,16}$.

The change in locations (such as measured by distance between geo-coordinates), $f_{i,17}$, is computed for user i and the feature score $s_{i,17}$ is assigned inversely proportional to $f_{i,17}$, i.e., $s_{i,17}=1/f_{i,17}$, where $s_{i,17}=0.5$ if $f_{i,17}=0$.

The number of times the social media posts of a user include any bot-characteristic word (such as "bot" or "app") is computed for user i, this number is mapped to a non-decreasing function $f_{i,18}$, (e.g., identity or indicator) and the feature scores $s_{i,12}$ is assigned directly proportional to $f_{i,18}$, i.e., $s_{i,18}=f_{i,18}$.

Scores $s_{i,2}$, $s_{i,4}$, $s_{i,5}$, $s_{i,14}$ and $s_{i,16}$ take values from [0,1]. On the other hand, scores $s_{i,1}$, $s_{i,3}$, $s_{i,6}$, $s_{i,7}$, $s_{i,8}$, $s_{i,9}$, $s_{i,10}$, $s_{i,11}$, $s_{i,12}$, $s_{i,13}$, $s_{i,15}$, $s_{i,17}$ and $s_{i,18}$ are normalized to [0,1] with respect to scores of others such as the maximum and minimum value of scores among users, i.e., $s_{i,k}$ is updated as $$\frac{s_{i,k} - \min_i s_{i,k}}{\max_i s_{i,k} - \min_i s_{i,k}}.$$

Note that if $\max_i s_{i,k}=\min_i s_{i,k}$, then feature score is assigned as $s_k=0.5$ if not already in [0,1].

All feature scores are projected then to a smaller (if any) dimension, by applying dimensionality reduction techniques (such as principal component analysis) and removing redundant components (if any).

The bot likelihood score is then assigned to each user as follows. First, bot detection checks whether user i is verified by the social media platform to represent a human user and assigns the bot likelihood score to be zero ($s_i=0$ for user i). Then, the scores of different bot features are mapped to bot likelihood score for each user in one of two ways:

The scores of different bot features are mapped by the weighted sum (normalized to be between 0 and 1) to bot score $s_i=\Sigma_{k=1}^{n_f} w_k s_{i,k}$, for each user i, where weights $w_k \in [0,1]$, $k=1,\ldots,n_f$, satisfy $\Sigma_{k=1}^{n_f} w_k=1$ and $n_f$ is the number of features. The weights can be selected as follows. Consider known human users (such as those from verified users), $N_H$, and bot users (such as those from suspended users), $N_B$. Then, ideally, $\Sigma_{k=1}^{n_f} w_k s_{i,k}=U$ for $t \in N_H$ and $\Sigma_{k=1}^{n_f} w_k s_{t,k}=1$ for $t \in N_B$. In practice, the difference $d_t=\Sigma_{k=1}^{n_f} w_k w_k s_{t,k}=U$ for $t \in N_H$ and the difference $d_t=1-\Sigma_{k=1}^{n_f} w_k s_{t,k}$ for $t \in N_B$ are minimized over weights. The best weights $w_k, k=1,\ldots,N_H$ can be selected by minimizing some function D of all differences $d_v$, $t \in N_H$ and $t \in N_B$, such as $D=\Sigma_i d_i$ or $D=\max_i d_i$. This way, best weights are selected as $$(w_1^*, \ldots, w_{n_f}^*) = \mathrm{argmax}_{w_s \ldots w_{n_f}} D(d_i, i \subset N_H, d_i, i \subset N_B)$$

subject to some potential constraints on individual features (e.g., $d_i$ for each user i is smaller than some threshold).

A classifier (such as Naive Bayes classifier) F is trained using feature scores $s_{i,k}$, $k=1, \ldots, n_f$, for known human and bot users i. This classifier $F_i(s_{i,k})_{k=1}^{n_f} = s_i \in [0,1]$ assigns normalized classifier confidence (such as likelihood in Naive Bayes classifier) as bot likelihood score $s_i$ for each user i and classifies users in the given social media data set into human user, i.e., $s_i$ is smaller than some threshold $\tau$ ($\tau=0.5$ if no prior distribution of bot or human user is unknown) $s_i < 0.5$, or bot user, $s_i > 0.5 s_i > 0.5$ i.e., $s_i$ is greater than $\tau s_i < 0.5$ (score $s_i = \tau s_i < 0.5$ is associated with bot or human randomly).

Bot detection displays social media posts and profile of each user along with corresponding bot score for human validation, and provides the end-user with the capability to maintain and update a whitelist of users, $L_W$, for human users and blacklist of users, $L_B$, for bot users and assigning the bot likelihood score for user i is set $s_i=0$, if $i \in L_W$ or $s_i=1$, if $i \in L_B$.

After bot score $s_i$ is assigned to each user i, users with score $s_i$ greater than some threshold are classified to types of bots (such as spam or propaganda bots). For each user i, different features $c_{i,j}$ regarding the content specific to bot type j are extracted, such as whether or how many times user descriptions, usernames or social media data posts of the user include content (such as a bag of words) specific to each particular bot type j. These features can be obtained from training data set with already categorized bots and can be combined to an aggregate score of likelihood that the user identified as a bot belongs to a particular category.

A Targeted search of bots is applied to determine the search parameter to detect a larger set of additional bots with higher bot scores compared to the previous search, thereby improving bot detection method. Query $Q_i$ collects data $D(Q_i)$ from social media at iteration i. Query $Q_i$ may include various features such as keyword, geolocation (longitude/latitude), and language. Aggregate bot score for data $D(Q_i)$ is computed with a function $F(D(Q_i))$, e.g., F measures the average scores of new bots (not detected in previous searches). Data collection is optimized over query $Q_i$ such that $Q_{i+1} = \mathrm{argmax}_Q F(D(Q))$. The updated query $Q_{i+1}$ is expected to drive the collection of social media data towards bots according to function F. An example of $Q_{i+1}$ in keyword search is the case when the query is updated with the number of top words found in social media posts by users with bot scores higher than a threshold but not included in top word list in previous query $Q_i$. The targeted search is terminated if $F(D(Q_i))$ drops below a predetermined performance threshold.

While the invention has been taught with specific reference to these embodiments, one skilled in the art will recognize that changes can be made in form and detail without departing from the spirit and scope of the invention. Therefore, the described embodiments are to be considered, therefore, in all respects only as illustrative and not restrictive. As such, the scope of the invention is indicated by the following claims rather than by the description.

The invention claimed is:

1. A computer implemented system of computing scores for features based on the pattern of historical social media usage and profile information, comprising:
   a computer having a processor and data storage capabilities including a non-transitory medium having computer executable instructions stored thereon, the computer receiving social media data;
   software means to obtain social media data sets with features representing historical user profile with a time of running loot detection;
   software means to assign a score to each feature;
   software means to compute a user account age;
   software means to assign the feature score inversely proportional to the user account age;
   software means to compute a number of times the username or user profile includes any bot-characteristic word; and
   software means to assign the feature score directly proportional to a non-decreasing function of the number of times the username or user profile includes any bot-characteristic word.

2. The system of claim 1, wherein the assignment of scores to features of a user includes:
   software means to compute a life post rate as the number of posts by the user normalized by a window size starting from the time of user account creation; and
   software means to assign the feature score directly proportional to the life post rate.

3. The system of claim 1, wherein the assignment of scores to features of a user includes:
   software means to compute an asymmetry of followers and friends counts, as a followers/friends ratio; and
   software means to assign the feature score directly proportional to the followers/friends ratio.

4. The system of claim 1, wherein the assignment of scores to features of a user includes:
   software means to compute a length of username; and
   software means to assign the feature score directly proportional to the length of username.

5. The system of claim 1, wherein the assignment of scores to features of a user includes:
   software means to compute a count of numbers in a username normalized by the maximum count of characters allowed in the username; and
   software means to assign the feature score directly proportional to the count of numbers in the username.

6. A computer implemented system of computing scores for features based on the pattern of historical social media usage and profile information, comprising:
   a computer receiving social media data;
   software means to obtain social media data sets with features representing historical user profile until a time of running bot detection;
   software means to assign a score to each feature; software means to compute a return of indicator function when the user uses API or auto-piloted programs for social-media posts; and
   software means to assign the feature score directly proportional to the return of indicator function when user uses API or auto-piloted programs for social-media posts.

7. A computer implemented system of computing scores for features based on the pattern of historical social media usage and profile information, comprising:
   a computer having a processor and data storage capabilities including a non-transitory medium having computer executable instructions stored thereon; the computer receiving social media data;
   software means to obtain social media data sets with features representing historical user profile until a time of running bot detection;
   software means to assign a score to each feature;
   software means to compute a change in locations of the user;

software means to assign the feature score inversely proportional to the change in locations of the user;
software means to compute a number of times the social media posts of a user include are a bot-characteristic word; and
software rears to assign the feature score directly proportional to a non-decreasing function of the number of times the social media posts of a user include any bot-characteristic word.

8. A computer implemented system of detecting hots in a social media data set, comprising:
   a computer having a processor and data storage capabilities including a non-transitory medium having computer executable instructions stored thereon, the computer receiving social media data;
   software means to compute scores for features of each user in the social media data set based on social media posts and interactions and assigning a score to each feature;
   software means to compute scores for features of each user in the social media data set based on the historical pattern of social media use and profile information, and assigning a score to each feature;
   software means to aggregate the scores for different bot features of each user;
   software means to assign the hot score to each user in the social media data set as the likelihood that a user is a hot or a human;
   software means to map each user's social media interactions to bot features, and assign scores to features as relative indicators of bot behavior specific to a given social media data set;
   software means to map each user's historical pattern of social media use and profile information to bot features as absolute indicators of bot behavior over the account lifetime;
   software means to compute the score of a feature separately per user; and
   software means to compute the score of a feature by normalizing it relative to other users' social media interactions, historical patterns and profiles.

9. The system of claim 8, wherein assignment of bot scores to users includes:
   software means to check verified users and users in white and black lists;
   software means to combine weighted sum of scores of features to the bot score assigned to each user; and
   software means to train a classifier to classify each user to a bot or human with the confidence of classifier assigned as the bot score to each user.

* * * * *